United States Patent

[11] 3,572,844

| [72] | Inventors | William D. Mundinger; Arthur F. Calvin, Highland, Ind. |
|---|---|---|
| [21] | Appl. No. | 764,471 |
| [22] | Filed | Oct. 2, 1968 |
| [45] | Patented | Mar. 30, 1971 |
| [73] | Assignee | Pullman Incorporated Chicago, Ill. |

[54] PNEUMATIC DISCHARGE ARRANGEMENT FOR HOPPERS
5 Claims, 3 Drawing Figs.

[52] U.S. Cl. .................................................. 302/52, 302/59
[51] Int. Cl. .................................................. B65g 53/40
[50] Field of Search .................................................. 251/147, 193, 204; 292/256.75, 257; 302/52—57, 59, 60

[56] References Cited
UNITED STATES PATENTS

| 862,626 | 8/1907 | Fisk | 251/147 |
| 917,911 | 4/1909 | Thompson | 251/147X |
| 2,190,726 | 2/1940 | McKenna | 302/57X |
| 2,418,302 | 4/1947 | Hornbrook | 302/52 |
| 2,650,726 | 9/1953 | Aller et al. | 302/52X |
| 3,048,448 | 8/1962 | Aller | 302/52 |
| 3,153,558 | 10/1964 | Borger | 302/52 |
| 3,194,420 | 7/1965 | Kemp et al. | 302/52X |
| 3,215,473 | 11/1965 | Kemp et al. | 302/52 |
| 3,306,675 | 2/1967 | Fritz | 302/52 |

Primary Examiner—Evon C. Blunk
Assistant Examiner—W. Scott Carson
Attorneys—Hilmond O. Vogel and Wyne Morris Russell ABSTRACT: A hopper includes a pneumatic discharge arrangement having an outer tube extending within the hopper and an inner rotatable tube adapted to discharge materials therefrom, said inner tube having opposite ends projecting from the hopper, and a closure member removably disposed over the opposite ends of said inner tube. A bail-shaped locking member is hingedly connected to each end of the inner tube and in the closed position locks the closure member in place. A stop on the bail limits the positioning of the bail in the closed position and is movable with the bail to an upright out-of-the-way position. The bail in the closed position prevents rotation of the tube and locks the same in a nonoperative position.

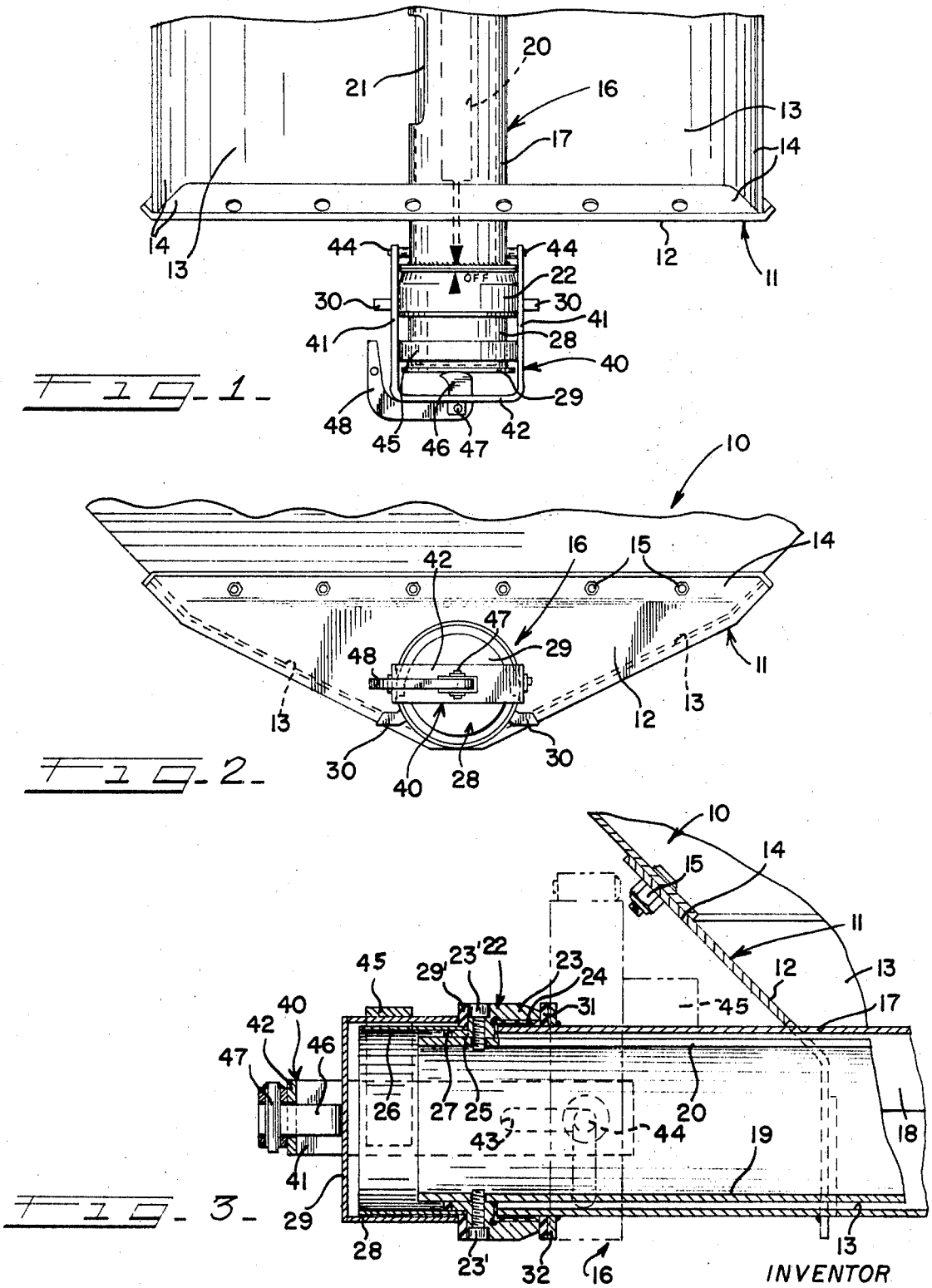

PNEUMATIC DISCHARGE ARRANGEMENT FOR HOPPERS

BACKGROUND OF THE INVENTION

1. Field of the Invention

The field of the invention pertains to hopper structures including a pneumatic discharge arrangement for discharging materials therefrom. The hopper is of a type associated with vehicles such as railway cars which include a discharge arrangement adapted to be connected to a source of suction which is attached to the hopper discharge arrangement when the hopper car has reached its destination.

2. Description of the Prior Art

It is conventional in the prior art to provide at the discharge end of a hopper structure a pneumatic outlet consisting of a tube which has open opposite ends adapted to be connected to a pneumatic discharge system for discharging the materials contained within the hopper. Discharge arrangements of this type generally include closure caps mounted over the opposite ends of the discharge tube for sealing the discharge tube when the railway hopper car is in transit. A bail-shaped member is generally mounted on the discharge tube and includes a suitable camming arrangement which is manually operative to tightly clamp the closure cap over the end of the tube. The bail-shaped member generally is swung downwardly out of the way of the closure cap so that it can be removed when it is desired to connect to a pneumatic discharge system.

SUMMARY

The invention is concerned with a bail-shaped locking arrangement for connecting a closure cap over the end of a discharge tube. The discharge tube is rotatable to a number of positions for regulating the discharge of materials from the hopper and is adapted in one position to be maintained in an off or nonoperative position during transit of the hopper car. The bail-shaped member is provided with a stop which permits the bail-shaped member to be pivoted from a closed locking position relative to the closure cap upwardly into an out-of-the-way and nonoperative position. The stop prevents downward hinging movement of the bail and rests upon the discharge tube in the locked position. In said locked position the bail prevents rotation of the discharge tube from its nonoperative position.

BRIEF DESCRIPTION OF THE DRAWINGS

FIG. 1 is a plan view of a portion of a discharge arrangement for a hopper structure of a railway hopper car;

FIG. 2 is a side elevational view of the structure shown in FIG. 1; and

FIG. 3 is an enlarged cross-sectional view showing the details of a discharge end of a pneumatic discharge arrangement with portions broken away to illustrate the invention.

DESCRIPTION OF THE PREFERRED EMBODIMENT

Referring to the drawings, a material discharge hopper is designated at 10 and includes at its lower end a pan 11 having a front wall 12 and sloping sidewalls 13. A transversely spaced rear wall (not shown) similar to the front wall 12 is provided and while only one side of the material discharge hopper 10 is disclosed the other side is symmetrical. The sloping sidewalls 13, front wall 12 and rear wall include flanges 14 which by suitable nut and bolt connections 15 are adapted to be secured to the discharge hopper 10 as best shown in FIG. 2.

A discharge arrangement is generally designated by the reference character 16 and includes a first stationary tube 17 extending across the interior of the pan 11. The tube 17 is provided, as best shown in FIG. 3, with a lower opening 18 which extends substantially coextensive with said tube 17 through the pan 11. A control and discharge tube is designated at 19 and is rotatable within the tube 17, the said discharge tube 19 extending outwardly from the pan 11 on opposite sides thereof as best shown in FIG. 3. The discharge tube 19 also is provided with a single intake slot 20 which in FIGS. 1 and 3 are shown in an off position with the slot 20 disposed immediately below the top underneath surface of the first tube 17. The construction and operation of the control and discharge tube 19 is more fully disclosed and described in applicant's copending application, Ser. No. 750,224 filed Aug. 5, 1968 now U.S. Pat. No. 3,527,503.

The stationary tube 17 is also provided at opposite ends with openings 21 which may register in one position with the intake slot 20 for effecting probe operation described in the aforementioned application. A collar 22 is connected at each end of the control and discharge tube 19 and includes a flange 23 which is connected by means of setscrews 23' to rotate with the tube 19. The setscrews 23' extend into oversize openings provided in the ends of the tube 19. An L-shaped annular element 24 is connected to the inner circumferential surface of the flange 23 to rotate therewith. The end of the flange 23 is in relative rotational sliding engagement with a ring 31 bonded to an annular plate 32 connected to the tube 17. The ring 31 is of a flexible plastic (polyurethane, neoprene, etc.) material. The ring 31 seals the tube 17 from the atmosphere. The L-shaped element 24 prevents frictional galling between the end of the tube 17 and the collar 22 as the same is rotated with the discharge tube 19. The collar 22 is also provided with an annular lip 25 which has connected thereto a stub section of tube 26 which is rotatable with the collar 22 and sealingly engages a seal 27 disposed between the internal periphery of the stub section 26 and the outer surface of the discharge tube 19. The seal 27 prevents a suction from being applied between the annular space formed by tubes 17 and 19 when pneumatic discharge takes place.

A cap or closure member 28 which includes an end plate 29 is placed over the stub tube 26 and into engagement with a seal 29'. Handle elements 30 project, as best shown in FIGS. 1 and 2, laterally outwardly with respect to the collar 22 and may be manually operated to rotate the collar 22 to a number of positions from the off position indicated in FIGS. 1, 2 and 3.

A locking bail is designated at 40 and includes a pair of legs 41 connected by a central member 42 with said legs 41 each including aligned slots 42. A pair of pivot pins 44 are mounted on the tube 17 and extend laterally outwardly with respect thereto as best shown in FIG. 1. The pivot pins 44 extend through the slots 43 and permit the bail 40 to be pivoted into the vertical position shown in FIG. 3. The bail 40 in its locking position, as best shown in FIGS. 2 and 3, is disposed in a manner wherein its legs 41 lie horizontally alongside the control tube 19 and the cap 28. In this position the arcuate stop plate 45 is in nesting engagement with the upper surface of the cap 28. Also in this position, which locks the cap 28 in position, the control tube 19 is disposed in a nonoperative position with the intake slot 20 disposed immediately below the upper inside wall of the stationary tube 17 as best shown in FIG. 3. A cam element 46 which is pivoted as indicated at 47, and includes a handle 48, is locked in position in engagement with the end plate 29 to firmly secure the cap 28 in its closed position. In the closed position as shown, the handle elements 30 project outwardly beneath the legs 41 and thus prevent rotation of the collar 22 so that the control tube 19 is maintained in its off position.

The arcuate stop plate 45 as has been described, prevents the bail 40 from dropping downwardly as is conventional in the art. FIG. 3 shows the bail 40 moved to a nonuse or out-of-the-way position where the stop plate 45 rests upon the outer surface of the stationary tube 17 and the bail 40 is maintained in its inoperative position. Thus it is clearly apparent that the bail 40 performs the function of locking the cap 28 over the end of the control tube 19 and also serves to lock the tube against rotation. The bail 40 further forces the cap 28 against the seal 29' and in turn the collar flange 23 is tightly compressed against the seal 31. Further, the improved sealing afforded by seals 29' and 31 reduces any possibility of leakage of material or air from the discharge arrangement when the hopper is in transit or connected to a pneumatic discharge arrangement.

We claim:
1. In a hopper construction having a bottom pan, a pneumatic discharge arrangement supported on said hopper including a first tube supported within said pan, a second tube rotatably mounted within said first tube having a discharge end and a material inlet opening, and means connected to said second tube to rotate said inlet opening to a plurality of circumferentially disposed openings relative to said first tube, comprising:
- a collar connected to said second tube to rotate therewith, said collar having an annular flange including an inner circumferential surface, overlying an end portion of said first tube;
- an L-shaped annular element having a first horizontal annular portion connected to the inner circumferential surface and a second vertical annular portion engaging the end portion of first tube in sealing and relative sliding relation during rotation of said collar;
- an annular plate connected around the peripheral surface of said first tube;
- a ring-shaped flexible element connected to said plate and engaged by said flange in relative sliding relation during rotation of said collar; and
- a closure cap releasably locked over the end of said second tube, said collar including a ring-shaped seal sealingly engaged by said closure cap in said locked position.

2. In a hopper construction having a bottom pan, a pneumatic discharge arrangement supported on said hopper including a first tube supported within said pan, a second tube rotatably mounted within said first tube forming a material discharge and having a discharge end and a material inlet opening and rotatable means connected to said second tube to provide for manual rotation, the improvement comprising:
- a closure member removably disposed over said discharge end;
- a locking arrangement including a bail having a central portion and opposedly spaced arms;
- pivot means on said first tube connecting said arms whereby said bail may be pivoted from an engaging locking position with respect to said closure member to an upright out-of-the-way position and said closure member may be removed;
- lock means connected to said central portion, and in one lock position of said bail locking said closure member over said discharge end;
- stop means on said bail engageable with said discharge tube for limiting downward hinging movement thereof from said lock position in which said spaced arms extend alongside said discharge tube;
- said bail being movable from said one lock position to a second out-of-the-way position wherein said arms extend upwardly above said discharge tube and said closure member may be removed from said discharge end;
- said manual rotating means including a pair of handle elements projecting outwardly from opposite sides of said second tube and in the locked position of said bail member being restrained thereby against rotation; and
- said first and second tubes defining valve means being moved between open and closed position upon relative rotation between the tubes, said bail in the lock position preventing rotation of said handle elements and thereby holding the valve means in the closed position.

3. The invention according to claim 2, and said stop means comprising an arcuate strap and in said one position of said bail resting on said tube adjacent said discharge end.

4. The invention according to claim 2, and said pivot means including slot means in each of said arms, and pivot pins on said first tube disposed in said slot means.

5. The invention according to claim 2, and said stop means in the upright position being supported on said first tube.